United States Patent [19]

Simciak

[11] 4,031,513
[45] June 21, 1977

[54] RF DATA EXCHANGE SYSTEM

[75] Inventor: Walter Simciak, Longwood, Fla.

[73] Assignee: Northern Illinois Gas Company, Aurora, Ill.

[22] Filed: Nov. 8, 1974

[21] Appl. No.: 522,019

[52] U.S. Cl. .......................... 340/152 T; 340/151;
 340/152 R; 340/171 PF
[51] Int. Cl.² ........................................ H04Q 9/00
[58] Field of Search .......... 340/152 R, 151, 152 T, 340/171 R, 171 PF; 325/8; 179/2 DP

[56] References Cited
UNITED STATES PATENTS

| | | | |
|---|---|---|---|
| 2,607,004 | 8/1952 | Harris | 325/8 |
| 3,566,384 | 2/1971 | Smith | 340/151 X |
| 3,705,385 | 12/1972 | Batz | 325/8 X |

Primary Examiner—Harold L. Pitts
Attorney, Agent, or Firm—Johnson, Dienner, Emrich & Wagner

[57] ABSTRACT

An improved remote meter reading system is disclosed comprising apparatus for transmitting UHF AM interrogating signals from an interrogating mobile or central station to a remote transponder station, and apparatus for retransmitting UHF FM data signals from the energized transponder to the mobile or central interrogating station. The interrogating station further includes apparatus for validating that the UHF FM data signals received are in fact the UHF FM data signals actually sent by the remote transponder selected by the interrogating or central station.

12 Claims, 2 Drawing Figures

RF DATA EXCHANGE SYSTEM

BACKGROUND OF THE INVENTION

1. Field of the Invention

This invention relates to a remote register reading system and more particularly to a remote register reading system wherein data representing a meter reading is transmitted over a UHF FM data signal link or a communication line to a mobile or central interrogation station from a register remotely located from the interrogating point, and wherein interrogating signals from the central or mobile interrogating point are transmitted over a UHF AM communication link to the remotely located register meter reading station.

2. Description of the Prior Art

U.S. Pat. No. 3,705,385 issued Dec. 5, 1972 and incorporated herein by reference, describes in greater detail a prior art remote meter reading system of which this invention is an improvement thereof. Basically, in order to measure the amount of a commodity such as gas, electricity, water and the like consumed by a customer of a utility company, meters are provided which include a register for recording the amount of the commodity used. These meter registers are periodically read by employees of the utility company who must go generally on foot to each meter location to read the meter registers. It can readily be appreciated that such a procedure entails a great deal of expense since there are many meters to be read which require many employees. It is desirable therefore to read these meters remotely either from a mobile station or a central station. One such system utilizes remote meter registers located in a more accessible central reading station, with each of these registers connected to the remotely located meter registers. In some systems the central collecting station is utilized to transmit the meter reading upon interrogation or automatically to a mobile station or to another larger central information gathering station. In some systems automation of meter readings has been attempted by providing means for reading of the meter from a remote central location by way of a communication line such as the telephone line of the customer. Yet, another system, hereinbefore referenced, provides a transponder at the location of each meter which is to be read, to transmit the reading of the meter at which the transponder is located to a remotely located mobile or central station upon command from the remotely located mobile interrogating station. In such a system RF AM radio signals are utilized to transmit and receive control and data signals. In such a system it is necessary that the transmit/receive operations be carried out at separate frequencies of sufficient separation that they do not interfere with each other. A high stability crystal oscillator is employed at the interrogating station in order to maintain good frequency and spectrum control for the system. Another solution is to use a free running LC oscillator which although more economical than the crystal oscillator has a drift characteristics such that tuning of the receiver at the opposite end is very difficult.

What is needed is an improved system similar to the Batz U.S. Pat. No. 3,705,385 which is economical to produce and install, does not corrode or deteriorate when exposed to the atmospheric elements, and exchanges information between the remote meter station and the mobile interrogating station in a non-interfering manner.

OBJECTS OF THE INVENTION

It is a primary object of the invention to provide an improved system for obtaining information from a plurality of remotely located data indicating devices.

It is another object of the invention to provide an improved remote meter reading system employing a remote meter transponder and a mobile or central interrogating station, wherein interrogation of the remote station by the mobile or central interrogating station is performed on a UHF AM channel, and the transmitting of data from the remote transponder station is performed on a UHF FM radio channel.

It is still a further object of the invention to provide an improved remote meter reading system including validation means to ascertain with a high degree of certainty that the data signals received by the mobile or central interrogating station are the data signals sent by the remote station.

SUMMARY OF THE INVENTION

The foregoing objects are achieved according to one embodiment of the invention by providing an improved system for obtaining information from a plurality of data indicating devices wherein the improvement is comprised of transmitting interrogating signals from an interrogating mobile or central station to a remote transponder station within the range of the central or mobile interrogating station, receiving said interrogating signals at all transponder stations within the interrogating range, energizing in response to the interrogating signals the remote transponder addressed by said interrogating signals, and retransmitting data signals from the energized remote transponder to the mobile or central interrogating station, and receiving said data signals at the mobile or central interrogating station and validating that the data signals received at the interrogating mobile or central station are the data signals actually sent by the remote transponder selected by the interrogating mobile or central station.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

DETAILED DESCRIPTION OF A PREFERRED EMBODIMENT

Figure 1:
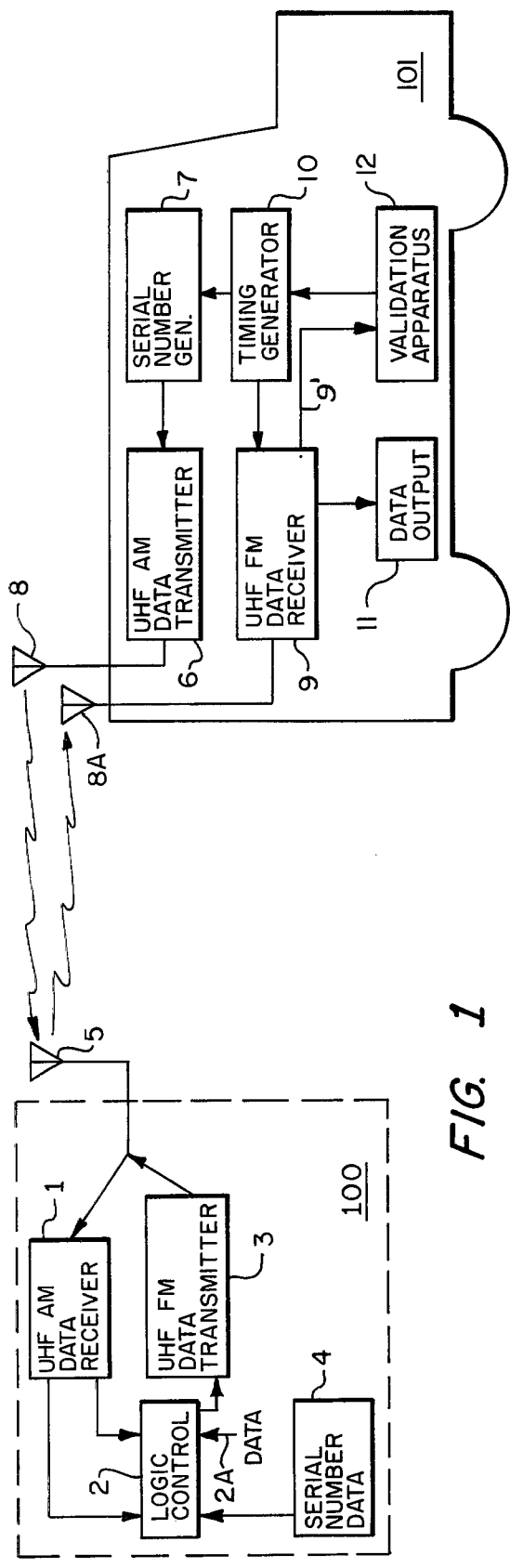
FIG. 1 is a block diagram of the improved remote meter reading system embodying the invention.

Referring to FIG. 1 there is shown a block diagram of as interrogating station, embodied as a mobile station or van 101, although an immobile central station may also be utilized in the system provided by the present invention for obtaining information from a plurality of data indicating devices, such as utility meters, via a two-way radio link established between the van 101 and a remote meter station 100 to be read. The serial number of a meter to be read is generated by Serial Number Generator 7 in a code suitable for transmission such as a 2 out of 5 code or any other suitable code and transmitted via UHF AM data transmitter 6 and antenna 8 to all transponders 100 within the range of the van 101 that are attached to various meters to be read at different locations. Each meter location includes a transponder unit 100 for receiving the coded control and serial number signals transmitted from the van 101 and for retransmitting back to the van other signals which represent the meter reading. The coded signals transmitted from the van 101 and received by the transponder 100 via antenna 5 and UHF AM data receiver 1 are applied to the logic controller 2 which generates clock signals by "OR" ing signals from UHF AM data receiver 1 and searches for hard wired serial number data from memory 4. When a match is obtained between the serial number transmitted and the serial number contained in memory 4 of a particular remote transponder station, the UHF FM data transmitter 3 is energized and transmits the data 2A representative of the meter reading of that particular remote station under control of clock signals received from the van 101 by UHF AM data receiver 1. The UHF FM data transmitter 3 is a battery operated LC type oscillator operating at a center frequency of 414 megahertz which has a drift characteristic of approximately 1½ megahertz on either side of the center frequency. The data signals transmitted by UHF FM data transmitter 3 to UHF FM data receiver 9 is tuned upon command from 412 to 416 megahertz by the timing generator 10 thereby insuring adequate frequency coverage in searching for the remote transponder signals. When a signal is received within the tuning of 412 to 416 megahertz of the UHF FM data receiver 9, the received signal is sent to the validation apparatus 12 (to be more fully described below) where a validation procedure is automatically performed to ascertain that the signal received is the signal actually sent from the remote transponder 100. If a valid signal was received, the timing generator 10 continues to provide timing signals to the remote transponder 100 for a time sufficient to read out and transmit the data form remote station 100. On the other hand, if the validation apparatus 12 indicated that the signal was not valid, the receiver would continue to tune the 412–416 $MH_z$ Range. If no valid signals were received, the timing generator 10 then readdresses all the remote stations within range of the van 101 and the process is repeated again until a correct validation of the incoming signal is received, whereupon the data is read out and transmitted by transponder 100 and received by UHF FM data receiver 9 and applied to a data output unit 11 such as paper tape, magnetic tape or other suitable medium. If no such valid signal occurs in a prescribed number of attempts, the apparatus would address a new transponder. The details of this remote meter reading system are described in the above reference Batz U.S. Pat. No. 3,705,385. This invention differs in that it has an improved data exchange system wherein data is transmitted from the remote transponder 100 to the van 101 via a common free running LC oscillator whose center frequency is 414 megacycles and is frequency modulated by 2 internal tone generators for a logical 1 at 14 KHz or a logical 0 at 10 KHz. The other major difference is the validation apparatus to be further described for ascertaining that the signal received by the van 101 is the actual signal transmitted by the transponder 100 and not some other signal carrying voice or music and transmitted by some nearby radio station.

It will be noted that the transmission of data from the UHF AM data transmitter 6 to UHF data receiver 1 is similar to the apparatus of the Batz U.S. Pat. No. 3,705,385. A three KHz Tone Burst represents a logic 1 and a 2 KHz Tone Burst represents a logic 0 and and are utilized to AM modulate a 450 MHz signal generated in UHF AM transmitter 6.

Figure 2:
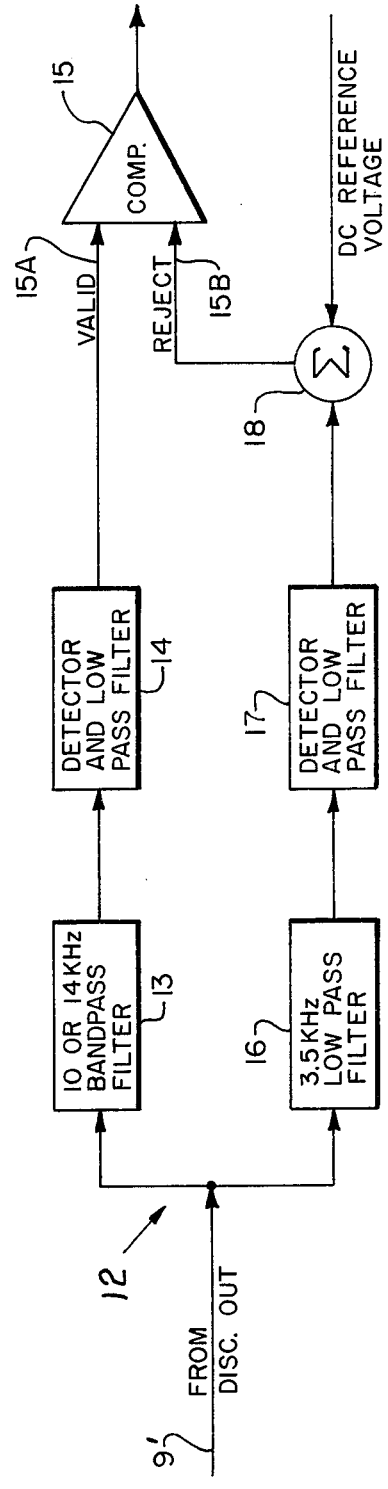
FIG. 2 is a block diagram of the validation system.

Referring now to FIG. 2, there is shown the validation apparatus which receives at its input 9' a signal from the discriminator output in the UHF FM data receiver 9. (Discriminators are well known in the art and are utilized to demodulate an FM signal and transform it into a baseband AM signal). The signal is then applied to a 10 or 14 KHz band-pass filter 13. The band-pass filter 13 is set to a 10 or 14 KHz frequency by the interrogating station (101 of FIG. 1) by examining the last bit of the encoded transponder serial number and setting the band-pass filter 13 to 10 KHz if the last bit examined is a 10 KHz signal and to 14 KHz if the last signal examined is a 14 KHz signal. The transponder (100 of FIG. 1) logic control unit will contain the last bit of the serial number when its UHF transmitter is energized since it obtains its data clock from the interrogating station and no further clock pulses have been sent or will be sent until a valid signal has been tuned by the interrogating station's receiver. (If no valid signal is received by the interrogating station, no further clock pulses are received by the valid transponder and its shuts down its transmitter (3 of FIG. 1) until reinterrogated by the correct serial number and this time hopefully the interrogating station being in range). The signal from the selected filter 13 is then applied to the detector and low-pass apparatus 14 which provides at its output a DC voltage which is proportional to the amplitude of the signal in either the selected 10 or 14 KHz band-pass area. The output of the discriminator in the UHF FM receiver is also applied to the 3.5 KHz low-pass filter 16 and the signal is then further applied to detector and low-pass filter 17 to provide a DC voltage proportional to the amount of the energy below 3.5 KHz. The DC voltage from the detector and low-pass filter 17 is applied to a summation unit 18 where it is summed to a DC reference voltage and applied to the inputs of a comparator 15. If a valid signal has been received by UHF FM data receiver 9 (i.e. there is a 10 or 14 KHz signal of substantial magnitude as compared to no signal or unmodulated signal or a voice signal below 3.5 KHz), then the signal applied at the input terminal 15A of comparator 15 will be greater than the signal applied at input terminal 15B of comparator 15 and a valid signal results.

There are four conditions that the validation apparatus will analyze relative to the received signal, and provide a yes or no answer as to the validity of the received signal. These conditions are as follows:

1. A straight carrier signal with no modulation is received and accordingly is a non-valid signal.

2. A voice band signal, up to 3.5 KHz has been acquired and accordingly a signal acquired is a non-valid signal.

3. A 10 or 14 KHz signal originating from a source other than a transponder having a lower or higher modulation index was acquired and accordingly is a non-valid signal.

4. A 10 or 14 KHz signal has been acquired which signal is indeed the signal sent from a remote transponder.

In the first case, when a carrier signal in the 412 to 414 MHz area has been acquired and it is not modulated by either a 10 or 14 KHz signal, it is an invalid signal, since all signals sent by a transponder 100 and receiver 9 of the van 101 carry information in the form of a 10 or 14 KHz signal. The validation apparatus detects this condition in the following manner. Since there is neither a 10 or 14 KHz signal present in the band-pass filter 13, the DC voltage emerging from detector and low-pass filter 14 is 0 or substantially 0. This very low DC signal is applied to input 15A of comparator 15. Also there is no 3.5 KHz energy on the carrier frequency and again the signal emerging from detector and low-pass filter 17 is 0 or substantially 0. However, this DC signal is added in summation unit 18 to a DC reference voltage which is applied to input terminal 15B of comparator 15. This DC reference voltage applied to terminal 15B is greater than the DC voltage applied to input terminal 15A of comparator 15; accordingly, an invalid or reject signal is given by the validation apparatus of FIG. 2.

The second case is the case where the carrier signal between 412 and 414 MHz has been modulated by voice or music-type signals. This modulation is generally below 3.5 KHz. Once again, when the search and validation process occurs, the van 101 has stopped transmitting any further clock pulses to the transponder 101.

Once again during the validation process, no appreciable DC voltage will emerge from the detector and low-pass filter 14 since there is not 10 or 14 KHz signal present and accordingly a 0 or substantially 0 signal is applied to the input 15A of comparator 15. On the other hand, there would be a substantial amount of signal energy in the 3.5 KHz area and below; accordingly a DC signal proportional to the 3.5 KHz energy emerges from the detector and low-pass filter 17 which is then summed to a DC reference voltage in summation unit 18 and applied to the input terminal 15B of comparator 15. It will now be noted that once again there is a substantially greater signal on the reject input terminal 15B as compared to the valid input terminal 15A and an invalid signal will result from comparator 15.

In case 3, we have a condition where carrier frequency in the 412–414 MHz range modulated by a 10 or 14 KHz signal has been acquired, but is not the signal transmitted by the remote transponder 100. In fact, such a signal may be transmitted by others operating in the same or near same band, but such a signal must comply with Rule 89 of the FCC which requires a 5 KHz modulation deviation ratio. (The deviation ratio is the maximum frequency deviation of the R-F carrier to the highest frequency contained in the modulating band). Under these conditions, the voltage coming out of the 10 or 14 KHz band-pass filter 13 would be extremely high; however, the voltage at the output of detector and low-pass filter 14 is proportional to the deviation ratio of the transmitter of that signal. If that transmitter is not in the remote transponder 100, it must operate under FCC rules and accordingly has a 5 KHz deviation which is not sufficient voltage to override the DC reference voltage applied to the reject terminal 15B by the summation unit 18. Hence, once again, under this condition where a foreign 10 or 14 KHz signal has been acquired, a reject condition is indicated by the validation apparatus of FIG. 2, and the process of transmitting identification information to the remote transponder and retransmitting information back to the band is repeated.

Case 4 represents the conditions where a valid signal has been acquired, modulated with 10 or 14 KHz FM signals which have in fact been transmitted by a transponder 100. Under these conditions, it will be seen that the 10 or 14 KHz signal from the UHF FM data receiver 9 in the band 101 is applied to the 10 or 14 KHz band-pass filter 13 and is then further applied to detector and low-pass filter 14 which converts this to a DC signal proportional to the 10 to 14 KHz signal and applies it to the input terminal 15A of comparator 15. Since no energy in the 3.5 KHz range and below is applied to low-pass filter 16, there will be no DC signal at the output of detector and low-pass filter 17. However, there is still a DC reference voltage signal applied to summation unit 18, which is applied to reject terminal 15B of comparator 15. Nonetheless, this DC reference voltage is not sufficient to overcome the voltage applied to the valid terminal 15A and accordingly a valid signal or high signal results at the output of comparator 15.

What is claimed is:

1. In a remote meter reading system having an individual transponder for each of a plurality of remotely located meters and interrogate means for energizing, requesting and receiving information from a selected one of said transponders, said interrogate means including interrogate transmitter means for transmitting electromagnetic signals over a UHF AM radio channel to initiate the readout of the information from said selected one of said plurality of remotely located meters, each of said transponders including data receiver means for receiving the UHF AM signals and data transmitter means responsive to said data receiver means for retransmitting UHF FM radio signals comprised of a carrier signal modulated by signals of predetermined frequencies for representing the information requested by said interrogate transmitter means, said interrogate means further including interrogate receiver means for receiving the UHF FM radio signals and validation means responsive to said interrogate receiver means to provide a control output for enabling said interrogate transmitter means to continue the readout of information from the selected meter whenever the UHF FM radio signals received by said interrogate receiver means are modulated at said predetermined frequencies.

2. A remote meter reading system as recited in claim 1 wherein said interrogate means includes timing means coupled to said interrogate receiver means for tuning said interrogate receiver means over the transmitting frequency spectrum of said data transmitter means.

3. A remote meter reading system as recited in claim 1 wherein said interrogate receiver means includes discriminator means for demodulating the UHF FM signal received by said interrogate receiver means and converting it into a baseband AM signal.

4. A remote meter reading system as recited in claim 3 wherein said validation means includes first detector means coupled to an output of said discriminator means for providing from the baseband AM signal a first DC signal proportional to the amplitude of the baseband AM signal.

5. A remote meter reading system as recited in claim 4 wherein said validation means further includes second detector means coupled to said output of said discriminator means for providing from the baseband AM signal a second DC signal proportional to the energy below a predetermined frequency level, and comparator means for comparing the first and second DC signals and for providing said control output in response to a predetermined difference between said first and second signals.

6. A remote meter reading system as recited in claim 5 wherein said validation means includes means for providing a DC reference voltage and summing means for summing the DC reference voltage and the second DC signal to decrease the difference between said first and second signals.

7. In a system for selectively obtaining information provided by a plurality of remotely located data indicating devices, interrogate means including transmitter means for transmitting interrogate signals to the locations of said data indicating devices for selecting one of said data indicating devices and for initiating the readout of the information provided by the selected data indicating device, and a plurality of data transponders each individually associated with a different one of said data indicating devices, the data transponder associated with the selected data indicating device being responsive to said interrogate signals to transmit a carrier signal modulated by signals at predetermined frequencies representing the information provided by the selected data indicating device, said interrogate means further including receiver means for receiving the modulated signals and for recovering the modulating signals therefrom, and validation means responsive to said receiver means to provide a control output for enabling said transmitter means to continue the readout of said selected data indicating device only when the modulating signals recovered by said receiver means are within a predetermined passband which includes said predetermined frequencies.

8. A system as set forth in claim 7 wherein said validation means includes first detector means connected to an output of said receiver means and responsive to signals at frequencies within said predetermined passband to provide a control signal related in amplitude to the deviation ratio of said data transponder, and output means responsive to a control signal of at least a predetermined amplitude to provide said control output.

9. A system as set forth in claim 8 wherein said validation means further includes second detector means connected to said output of said receiver means and responsive to signals below a predetermined frequency for preventing said output means from responding to said first detector means.

10. In a system for selectively obtaining information provided by a plurality of remotely located data indicating devices, interrogate means including transmitter means, and timing means for controlling said transmitter means to transmit select signals for selecting one of said data indicating devices and to thereafter initiate the transmission of readout signals for controlling the readout of the information provided by the selected data indicating device, and a plurality of data transponders each individually associated with a different one of said data indicating devices, the data transponder associated with the selected data indicating device being enabled by the select signals to be responsive to the readout signals to transmit a carrier signal modulated by signals at predetermined frequencies representing the information provided by the selected data indicating device, said interrogate means further including receiver means for receiving the modulated signals and for recovering the modulating signals therefrom, and validation means responsive to said receiver means to provide a control output for enabling said timing means to continue the transmission of readout signals whenever the modulating signals recovered by said receiver means are within a predetermined passband which includes said predetermined frequencies.

11. A system as set forth in claim 10 wherein said validation means includes first detector means responsive to modulating signals within said first passband to provide a first control signal, second detector means responsive to modulating signals below a given frequency to provide a second control signal, and comparator means responsive to a first predetermined difference between control signals provided by said first and second detector means to provide said control output, said comparator means being prevented from providing said control output in response to a second predetermined difference between control signals provided by said first and second detector means.

12. A system as set forth in claim 11 wherein said validation means includes means for providing a reference signal, and summing means for summing said reference signal and said second control signal to provide a signal for normally disabling said comparator means, said comparator means being enabled to provide said control output whenever the amplitude of said first control signal exceeds the amplitude of the signal provided by said summing means.

* * * * *